(12) United States Patent
Elmasry et al.

(10) Patent No.: US 7,616,572 B2
(45) Date of Patent: Nov. 10, 2009

(54) CALL ADMISSION CONTROL/SESSION MANAGEMENT BASED ON N SOURCE TO DESTINATION SEVERITY LEVELS FOR IP NETWORKS

(75) Inventors: George F. Elmasry, North Attleboro, MA (US); C. John McCann, Needham, MA (US)

(73) Assignee: General Dynamics C4 Systems, Scottsdale, AZ (US)

( * ) Notice: Subject to any disclaimer, the term of this patent is extended or adjusted under 35 U.S.C. 154(b) by 973 days.

(21) Appl. No.: 10/813,603

(22) Filed: Mar. 31, 2004

(65) Prior Publication Data

US 2005/0030952 A1 Feb. 10, 2005

Related U.S. Application Data

(60) Provisional application No. 60/459,231, filed on Mar. 31, 2003.

(51) Int. Cl.
*H04L 12/26* (2006.01)
*H04L 12/28* (2006.01)

(52) U.S. Cl. ...................... 370/235; 370/230; 370/231

(58) Field of Classification Search .................. None
See application file for complete search history.

(56) References Cited

U.S. PATENT DOCUMENTS

| 5,557,608 | A | * | 9/1996 | Calvignac et al. | 370/389 |
|---|---|---|---|---|---|
| 6,081,513 | A | | 6/2000 | Roy | |
| 6,400,954 | B1 | * | 6/2002 | Khan et al. | 455/450 |
| 7,260,060 | B1 | * | 8/2007 | Abaye et al. | 370/230 |
| 2002/0004841 | A1 | * | 1/2002 | Sawatari | 709/232 |
| 2002/0124106 | A1 | | 9/2002 | Dolganow et al. | |

* cited by examiner

*Primary Examiner*—Raj Jain
(74) *Attorney, Agent, or Firm*—Ingrassia, Fisher & Lorenz, P.C.

(57) ABSTRACT

In a first aspect, an apparatus may include a first node and a second node. The first node may be configured to transmit packets of data to the second node. A first processor may be associated with the first node and a second processor may be associated with a second node. The second processor may be configured to calculate a severity level. The severity level may then be transmitted to the first node so that the first processor can determined a call admission policy (CAC/SM) policy to regulate the transmission of packets of data from the first node to the second node. In one embodiment, the number of severity levels associated with a particular network configuration may vary according to sensitivity.

25 Claims, 10 Drawing Sheets

CALL ADMISSION CONTROL/SESSION MANAGEMENT BASED ON N SOURCE TO DESTINATION SEVERITY LEVELS FOR IP NETWORKS

CROSS REFERENCE TO RELATED APPLICATIONS

This application is a non-provisional application of Provisional Application Ser. No. 60/459,231 filed Mar. 31, 2003, entitled "Call Admission Control/Session Management Based on N Source to Destination Severity Levels for IP Networks," which is hereby incorporated by reference in its entirety.

FIELD OF THE INVENTION

This invention relates generally to the control and maintenance of quality of service (QoS) in telecommunications networks. More particularly, the invention relates to the maintenance of QoS within a packet switched network using a combined call admission control/session management (CAC/SM) algorithm.

BACKGROUND OF THE INVENTION

Packet switched networks transmit data in packets between two or more nodes. Packets include data frames having header records that provide relevant information to the network. This header information may identify the packet to the network. Each node in a packet switched network may advance the packet towards its final destination by handing it off to the next node in, for example, a chain of nodes. These nodes are conventionally controlled by software. This software may include algorithms that handle, for example, network congestion and may also determine the most optimal route for a particular packet to a particular destination.

Adding a new call to an IP network may not only cause the new call to violate QoS requirements, but may also cause deleterious effects on other calls or sessions taking place on the network. This may occur when, for example, the call or session shares resources with other calls or sessions on the network. In order to maintain the proper functionality of networks and to continue providing reliable service, it is important not to admit a call into the network unless is will meet QoS requirements for the network with a relatively high probability.

Conventional packet switching algorithms may regulate the QoS in a non-distributed fashion, leading to complex control and packet routing schemes. Some exemplary methods of solving various problems with maintaining an acceptable QoS include: queue management, load distribution, and traffic shaping. Other methods may include the utilization of call admission control (CAC) and/or session management (SM). For example, a control algorithm may typically be run from a remote location, such as, for example, a mainframe computer. This network control algorithm may then be utilized to control traffic to and from various nodes throughout the network depending on various network conditions such as, for example, network congestion or failure.

This conventional approach suffers from a number of drawbacks. One such drawback is that the algorithm is traditionally very complex, and in many instances will need to evaluate traffic throughout the network (e.g., at each node) to control traffic entering and exiting, for example, a WAN at each of the nodes. Thus, the calculations required for a network-wide control may be time consuming and may require a great deal of processing resources. Additionally, the addition of new nodes to the network may be problematic as the network-wide algorithm may have to be revised and updated to satisfy the changes to the network. Additionally, some conventional approaches may admit certain calls to a network and determine only a few seconds later that that call violates QoS requirements, which may require the network to subsequently drop the call after the call has had the opportunity to negatively impact ongoing calls or sessions on the network.

As can be seen from the foregoing, a need exists for a control algorithm that can manage the transmission of data in a packet switched network in a distributed fashion. Additionally, what is needed is an algorithm that is scalable and that permits the addition and subtraction of nodes from the network with minimal reconfiguration requirements. Additionally, what is needed is an algorithm that is a combination of CAC and SM.

In addition, in some networks (e.g., military networks), security requirements uses an encryption device that prevents communicating QoS information from the core Wide Area Network (WAN) to the Local Area Network (LAN) at the ingress point where call admission control occurs. Thus, the need exists for a call admission control algorithm that looks at the WAN as a black box, measure the WAN performance, and generate admission and preemption policies in a distributed and scalable fashion without requiring any WAN information to cross the security boundary.

Also, with the old circuit switched networks, Multi-Level Precedence and Preemption (MLPP) is well defined for telephony (voice). With the emerge of packet switched networks with heterogeneous traffic (voice, video, and data), a call admission and session management technique that consider MLPP for heterogeneous traffic is needed.

SUMMARY OF THE INVENTION

In light of the above-identified deficiencies of contemporary methods and systems, it is an object of the invention to provide a method and system for maintaining QoS in a telecommunications network using a call admission control/session management (CAC/SM) algorithm. It is also an object of the invention to provide an method and apparatus for managing the QoS of a network using a call admission policy, such as a CAC/SM, in an environment where no QoS information is transmitted to points outside of the WAN.

In one aspect, an apparatus may include a first node and a second node. The first node may be configured to transmit packets of data to the second node. A first processor may be associated with the first node and a second processor may be associated with a second node. The second processor may be configured to calculate a severity level reflecting the condition of the core network path used. The severity level may then be transmitted to the first node so that the first processor can apply a call admission policy to regulate the transmission of packets of data from the first node to the second node.

In one embodiment, the severity level may be determined based on packet delay and packet loss ratio between the first node and the second node. In an alternative embodiment, the packets of data may be associated with a plurality of classes of data, and the call admission policy may be configured to block calls/sessions of predetermined classes of calls/sessions when the severity level is greater than a threshold severity level. In yet another embodiment of the invention, the call admission policy may be configured to block calls or sessions of data associated with predetermined subclasses of calls/sessions. In one embodiment, the subclasses may be based on the bandwidth to be used by the call/session.

In yet another embodiment, a third node may be configured to transmit packets of data to the first node. The third node may be associated with a third processor. A processor associated with the first node may be configured to calculate a severity level associated with the data transmission between the first node and the third node. The first node may transmit data associated with the severity level to the third node so that the third node can establish a call admission policy associated with the severity level to regulate the transmission of data between the first node and the third node.

In an alternative embodiment, an apparatus may include a third node. The third node may be configured to receive packets of data from the first node. The third node may be associated with a third processor. The third processor may be configured to calculate a severity level based on the data packets received from the first node, and may transmit data associated with the severity level to the first node so that the first node can determine a call admission policy to regulate the transmission of packets from the first node to the third node.

Other embodiments of the invention may include a memory device. The memory device may be associated with, for example, the first node, and may be configured to store at least some of the following information: severity level; packet delay; packet loss; and the total number of received packets. In yet another embodiment, the memory device may be configured to store data associated with a destination list and a source list, the destination list may include data associated with packets of data being transmitted from the first node to the second node and the source list may include data associated with the packets of data being received at the first node.

In another aspect, a method according to the invention may include transmitting a packet of data from the first node to the second node. These packets of data may be received by the second node. A severity level may be determined at the second node based on the packets of data received from the first node. In one embodiment, if the severity level has changed, data associated with the severity level may be transmitted back to the first node. The first node may receive the data associated with the updated severity level and the call admission policy may be updated to regulate the transmission of data from the first node to the second node.

In one embodiment, the method may include determining the severity level based on a packet loss, packet jitter, and packet delay. In an alternative embodiment, the call admission policy may be applied to reconfigure the network when the severity level has been changed. The change may result in either (1) calls or sessions associated with a previously blocked class of calls or sessions being admitted; or (2) calls or sessions associated with a previously admitted class of packets being blocked. In another embodiment of the invention, the call admission policy may be applied to preempt calls on the network.

In yet another embodiment of the invention, a method may include transmitting packets of data from a third node to a first node. The packets may be received at a first node, which may determine a severity level based on the received packets. If the severity level has changed, data associated with the severity level may be transmitted back to the third node. The call admission policy may be applied to regulate the transmission of packets from the third node to the first node. In yet another embodiment of the invention, the method may include transmitting packets of data from a first node to the third node. The packets may be received at the third node, and a second severity level may be determined. Data associated with the second severity level may be transmitted to the first node, and the call admission policy may be applied at the first node based on the severity level to regulate the transmission of packets from the first node to the third node based at least on the second severity level.

Other embodiments of the invention may include storing data associated with at least one of the following: (1) a severity level; (2) the total number of packets received; (3) a packet loss; (4) packet jitter; and (5) packet delay. In an alternative embodiment, data associated with a destination list and a source list may be stored in a memory. A destination list may include data associated with packets of data being transmitted from the first node to the second node. A source list may include data associated with packets of data being received at the first node.

In another aspect of the invention, processor readable code stored on a processor readable medium may include code to receive data associated with a severity level. The severity level may be determined at a second node based on a packet of data transmitted from the first node to the second node. The code may include code to determine if the updated severity level has changed, and may include code to apply a call admission policy based on the severity level to regulate the transmission of packets of data from the first node to the second node.

In an alternative embodiment, the processor readable code may include code to calculate a cost function based on the packet of data received from the first node and may update the severity level based on the cost function. The severity level may be transmitted to a remote node. In another embodiment according to a third aspect of the invention, the processor-readable code may include code for applying a call admission policy to admit a first class of calls when the severity level decreases and to block a second class of calls when the severity level increases. In yet another embodiment of the invention, the processor-readable code may include code for applying the call admission policy to admit calls which may consume or occupy a predetermined bandwidth associated with a predetermined class when the severity level decreases and to block calls less than or equal to a predetermined size (i.e., bandwidth) associated with the predetermined class when the severity level increases.

BRIEF DESCRIPTION OF THE DRAWINGS

While the specification concludes with claims particularly pointing out and distinctly claiming the invention, it is believed the same will be better understood from the following description taken in conjunction with the accompanying drawings, which illustrate, in a non-limiting fashion, the best mode presently contemplated for carrying out the present invention, and in which like reference numerals designate like parts throughout the Figures wherein:

DETAILED DESCRIPTION OF THE INVENTION

The present disclosure will now be described more fully with reference to the Figures in which embodiments of the present invention are shown. The subject matter of this disclosure may, however, be embodied in many different forms and should not be construed as being limited to the embodiments set forth herein.

Figure 1:
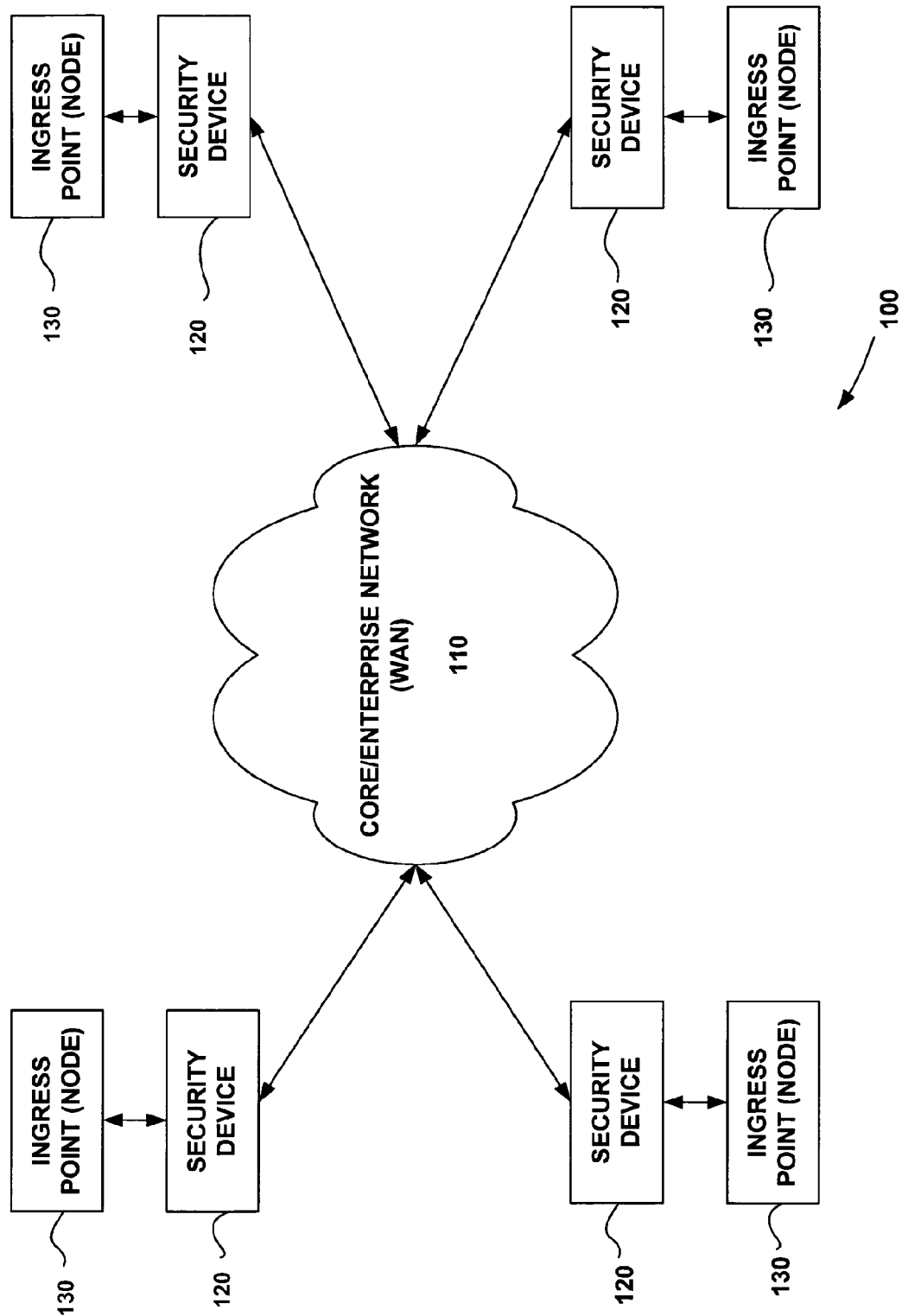
FIG. 1 is a network topology showing a portion of a network according to an embodiment of the invention.

FIG. 1 shows an exemplary network topology 100 having a core (WAN) 110 and multiple LANs communicating over the WAN. An algorithm according to an aspect of the invention may reside at the ingress point node 130 of each LAN. The algorithm may also be configured to permit each LAN to block, admit, or preempt calls without requiring any QoS information exchange with the WAN 110. The absence of QoS information may be due to, for example, security requirements, which may be enforced by security devices 120 (as in military networks). Alternatively, the absence of QoS information may be because the WAN was developed by a service provider and services were sold to enterprise networks and the service provider elected not to communicate QoS information to the enterprise LANs. An algorithm may thus be used in connection with both military networks with security requirements (e.g., encryption devices) and for commercial enterprise networks with no QoS information coming from the core service provider network. One aspect of an algorithm utilizing embodiments of the present invention permits the algorithm to view, for example the WAN network 110 as a black box, and therefore does not require QoS information from the WAN to regulate the flow of information into the, for example, WAN.

Figure 2:
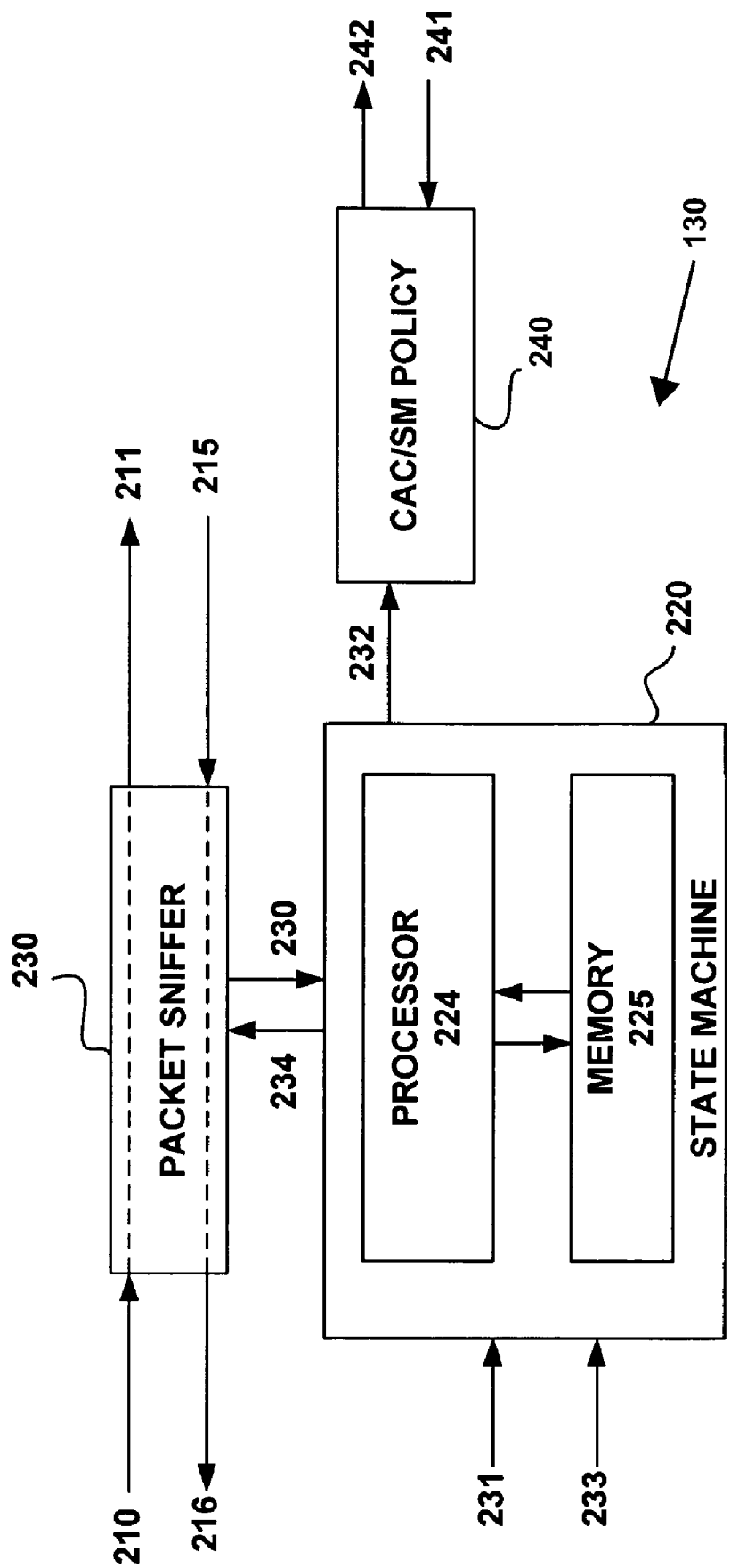
FIG. 2 is a functional block diagram of an ingress/egress node according to an embodiment of the invention.

FIG. 2 is a functional block diagram of the ingress point 130 as a node on, for example, a LAN according to an embodiment of the invention. The ingress point node 130 may include a first input 210 and a first output 211. The first input 210 and the first output 211 may be indicative of, for example, upstream traffic coming from the WAN 110 to distant LAN users. The ingress point node 130 may also include a second input 215 coupled with a second output 216. The second input 215 and the second output 216 may indicate, for example, downstream traffic initiated by the LAN users, which may be distant to remote users across the WAN 110. These two streams may be processed by a packet sniffer 230 and raw information, such as, for example, packet delay, jitter, and packet loss may be sent to a state machine 220 as input 230. The state machine 220 may receive other inputs as well. For example, input 231 may reflect severity levels calculated at remote ingress points (i.e., at points across the WAN), which are sent to the local state machine 220. Input 233 reflects input to the state machine 220 from network configuration devices. The state machine 220 may include a memory 225 and a processor 224 coupled to the memory 225. The state machine 220 may be configured to control the ingress point call admission policy 240. In one embodiment, the call admission policy may be, for example, a CAC/SM policy 240. Other types of policies, such as, for example, multilevel preemption and precedence policies may be implemented as policies using the methods and systems of the present invention. An output 232 may be produced from the state machine 220 to change CAC/SM policies in 240 ingress point engine, which is collocated with packet sniffer 230. The input 241 to the CAC/SM policy 240 may reflect call/session arrival from the ingress point gatekeepers, which the output 242 from the CAC/SM policy may reflect the admissions, denial, and/or preemption decisions sent to the ingress point gatekeepers. The output 242 from the CAC/SM policy 240 may be optimized for QoS.

The processor 224 may be configured to calculate a cost function. Based on the cost function, the processor 224 may determine whether to change a severity level associated with the upstream node. In another embodiment of the invention, the processor 224 may be configured to be coupled to a memory 225, and may implement, based on information stored in memory 225, a CAC/SM policy 240 based on a severity level received via input 233. Based on the CAC/SM policy 240 that may be implemented by processor 224, certain calls may be admitted or blocked by the ingress point gatekeepers. In yet another embodiment, processor 224 may be configured to retrieve information associated with a source list and a destination list that may be stored in memory 225, which creates an independent state machine 220 for each of the destination nodes over the WAN 110 that communicate with the local LAN. The processor 224 may also be configured to store information in source and destination lists within memory 225.

In one embodiment of the invention, the CAC/SM policy 240 may include a multilevel precedence and preemption policy (MLPP), which is capable of scaling network traffic to maintain QoS based on, for example, call/message survivability requirements and/or bandwidth requirements associated with conditions on the network in real-time or near-real-time. The use of an algorithm according to methods of the present invention may result in a network capable of healing congestion due to a sudden surge of traffic demand within, for example, 5 seconds.

Figure 3:
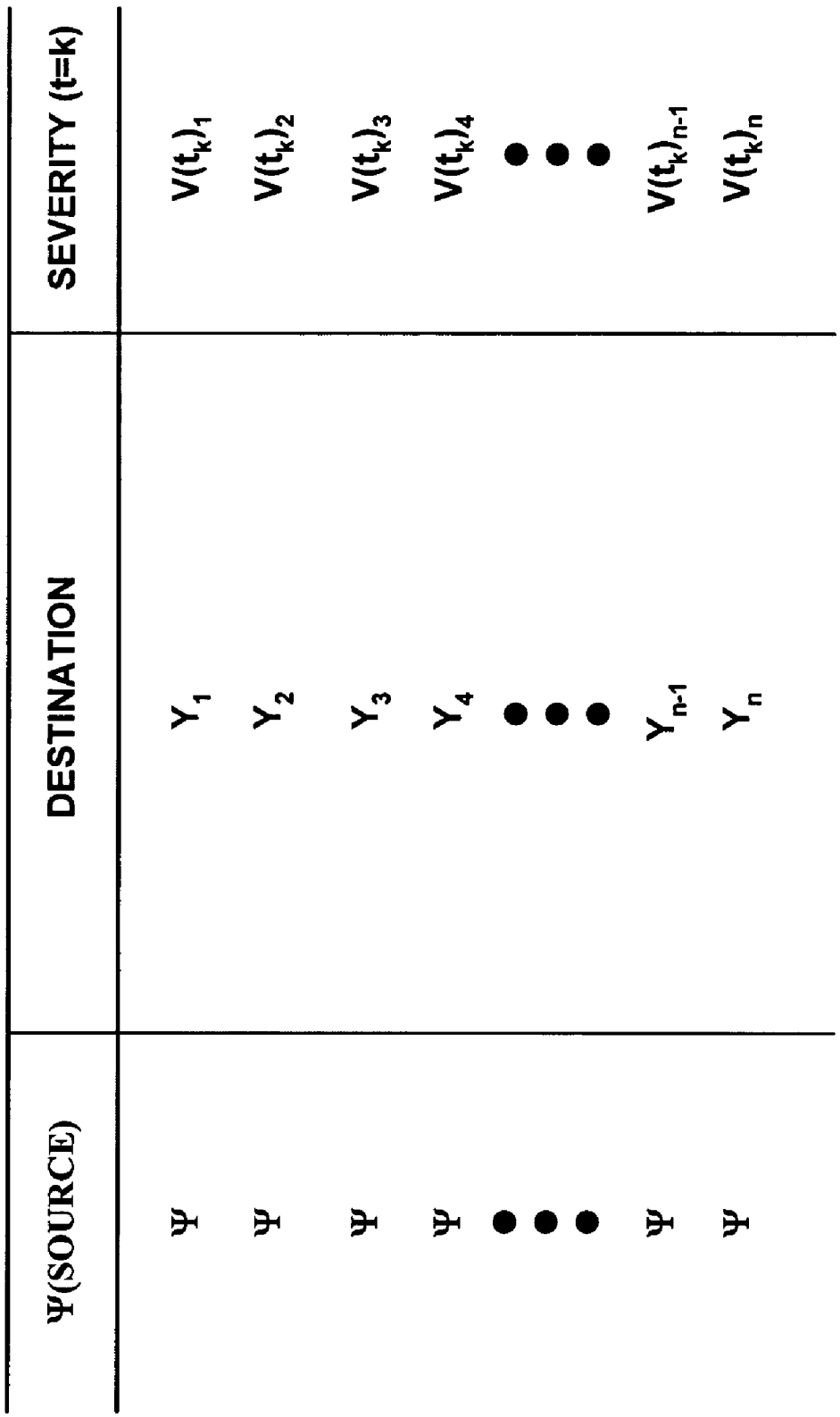
FIG. 3 is a table illustrating a destination list according to an embodiment of the invention.

FIG. 3 is a table illustrating a destination list according to an embodiment of the invention. In the table illustrated in FIG. 3, the source node ($\psi$) may be configured to send packets to destination nodes $Y_1$ to $Y_N$. As illustrated in FIG. 3, the severity level associated with the path between node $\psi$ and n nodes $Y_1$ to $Y_N$ may be listed in the destination table. These severity levels are illustrated as $V_\psi(t_k)$, and may be received from the downstream nodes. In one embodiment, the severity levels are updated on a regular basis, such as, for example but not limited to, every few seconds. One skilled in the art will recognize that the update time may, however, be adjusted in connection with the invention.

Figure 4:
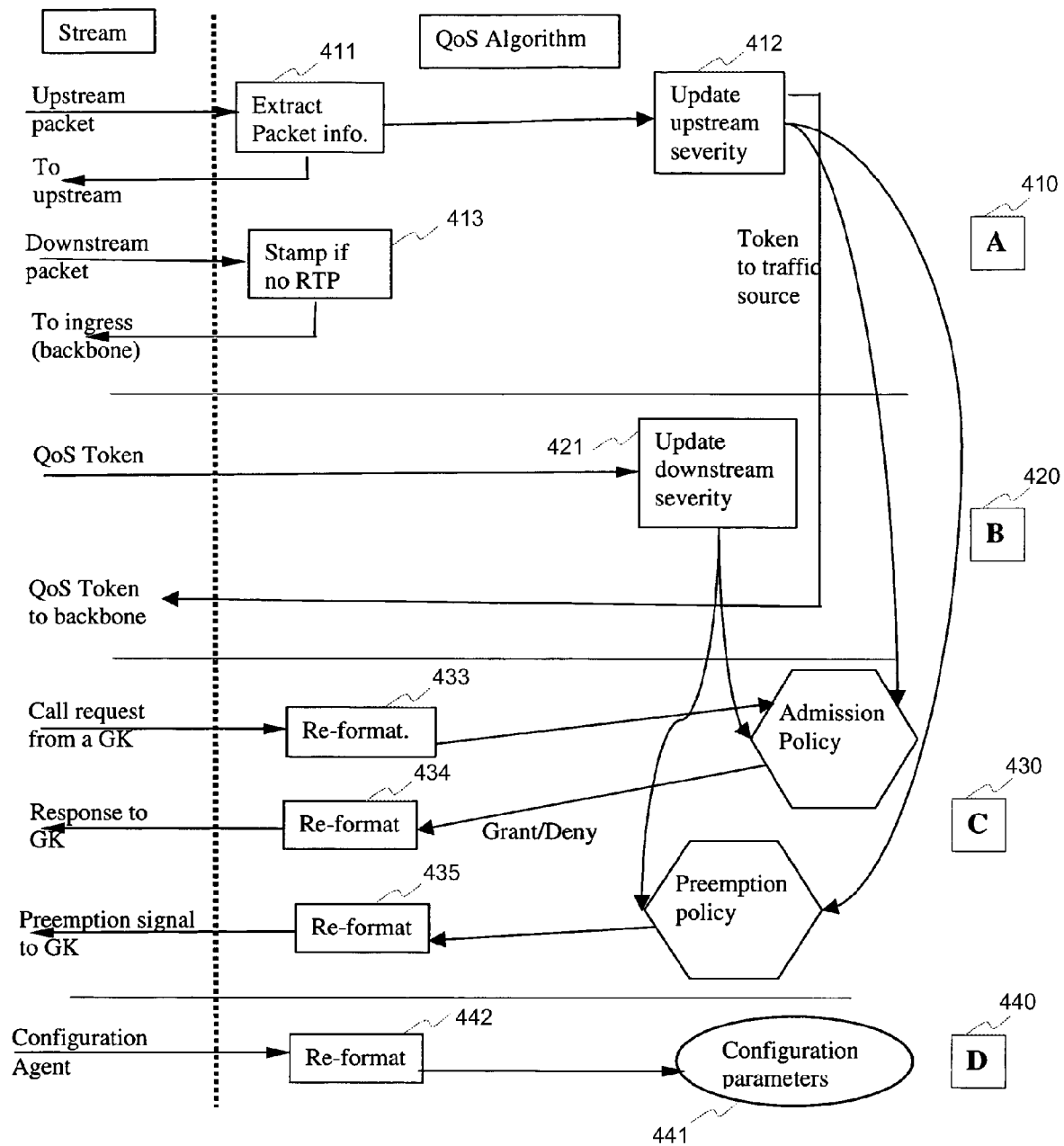
FIG. 4 is a signaling diagram illustrating how data transmission may be regulated in a packet switched network according to an embodiment of the invention.

FIG. 4 is a signaling diagram illustrating how data transmission may be regulated in a packet switched network according to an embodiment of the invention. The signaling diagram illustrated in FIG. 4 may be used as a base for designing all threads associated with the algorithm. This signaling diagram is split into two vertical segments, and is divided horizontally into four segments. The vertical segments include "stream" and "QoS Algorithm" sides. Horizontally, segment A (410) covers activities associated with user traffic; segment B (420) includes activities associated with the QoS token; segment C (430) includes activities associated with call arrival, such as, for example, admission and preemption of calls; segment D (440) includes configuration agent activities.

User traffic activities 410 may be divided into two activities: upstream activities, and downstream activities. The upstream activities may include activities associated with packets that have their origin in remote nodes and may have their destination within the local LAN. In one embodiment of the invention, the QoS algorithm may intercept a packet and may extract the relevant information from the packet 411. The QoS algorithm may then place the packet back on its course substantially unchanged. Some examples of relevant information that may be extracted at 411 may include time stamps, source IP addresses, type (e.g., udp or tcp), precedence (routine, priority, immediate, flash, or flash override), session number, packet sequence number etc. This list is not intended to be exhaustive and is merely illustrative of the type of data that may be extracted from the packet at 411. After the relevant information has been extracted from the packet, the QoS algorithm may be configured to update the upstream severity level 412, as will be described in further detail below.

Downstream activity may include activities that are performed on packets originated at the local LAN. A downstream packet may be intercepted before being delivered to the ingress point in the network. The QoS algorithm may intercept the packet and determine if it is compatible with, for example, Real Time Protocol (RTP). If the packet is compatible with RTP, and the packet is coming from a known and trusted gatekeeper, the packet may pass unchanged. In one embodiment, if the packet is RTP compatible and originates from an unknown or un-trusted source, then the QoS algorithm may change the Differentiated Services Code Point (DSCP) associated with the packet to best effort. If the packet is not RTP compatible, the QoS algorithm may stamp the packet header 413. The stamp may include placing information associated with the current network time, session number, and the packet sequence number (or RTP header) in the header of the packet. Finally, the QoS algorithm may send this packet to the ingress point in the network to be delivered to its destination through, for example, the backbone network.

Activities associated with the QoS token 420 may also be divided into two types of activities. The first type of activity may include receiving QoS tokens from a remote node algorithm. The second type of activity may include transmitting QoS tokens from the local algorithm to a remote node. The QoS token may be associated with, for example, a severity level associated with data from the upstream node, and transmitting QoS tokens may include, for example, updating the downstream severity level 421.

Activities associated with call arrival, such as, for example, admission and preemption of calls 430 may also be divided into two types of activities. The first activity may include receiving a request coming from, for example, a gatekeeper agent to the algorithm. The request from the gatekeeper may include a request for the admission of a call. The algorithm may be configured to determine what effect the call will have on QoS and determine whether to admit or deny the request from the gatekeeper. The second activity may include preemption signaling. This type of signaling may be initiated by the algorithm when the severity level to a specific destination increases to specific values as will be described in detail below. Preemptive signaling may be sent to the corresponding gatekeeper (e.g., the originator of the call/session) with an identifier associated with the call/session number to be preempted. Activities associated with the configuration agent activities may occur through, for example, a configuration agent. In one embodiment of the invention, the QoS algorithm may register for updates of configuration parameters 441 stored in a configuration file. According to this embodiment, a configuration agent may be configured to notify the algorithm of any new configuration values. The algorithm may then update its configuration accordingly. Configuration activities may include two types of configuration activities. One type is updates to policy information, and the other is a QoS thresholds update. With respect to changes to the policy, for example, during a certain maneuver no routine traffic may be allowed. In one embodiment, the QoS algorithm may turn the configuration interrupt with this policy to an update of its blocking and preemption policy. The QoS algorithm may then make the lowest severity level it can reach to be a higher threshold level instead of the original threshold level. This may enforce the newly designated policy. At the end of the maneuver, the configuration agent may change the policy to accept all traffic and the QoS algorithm may react by forcing the admission policy associated with original threshold severity level. A similar process may also be followed for changes in QoS threshold values, as appropriate.

Since the QoS algorithm may generate and receive information from the outside world in a predetermined or expected format, information exchange to and from the algorithm may need to be formatted to conform with the predetermined format. This reformatting is illustrated as 433, 434, 435, and 442. For example, in a call request 433, which may come from, for example, a gatekeeper in standardized RSVP format, the reformatting 433, 434, 435, and/or 442 may reformat the RSVP formatting to a format that the algorithm expects. Similarly any response or preemption notice from the algorithm may be reformatted to RSVP so that the gatekeeper receives the data in a format that it expects. Also the configuration management information exchange may be reformatted in a similar manner.

Figure 5:
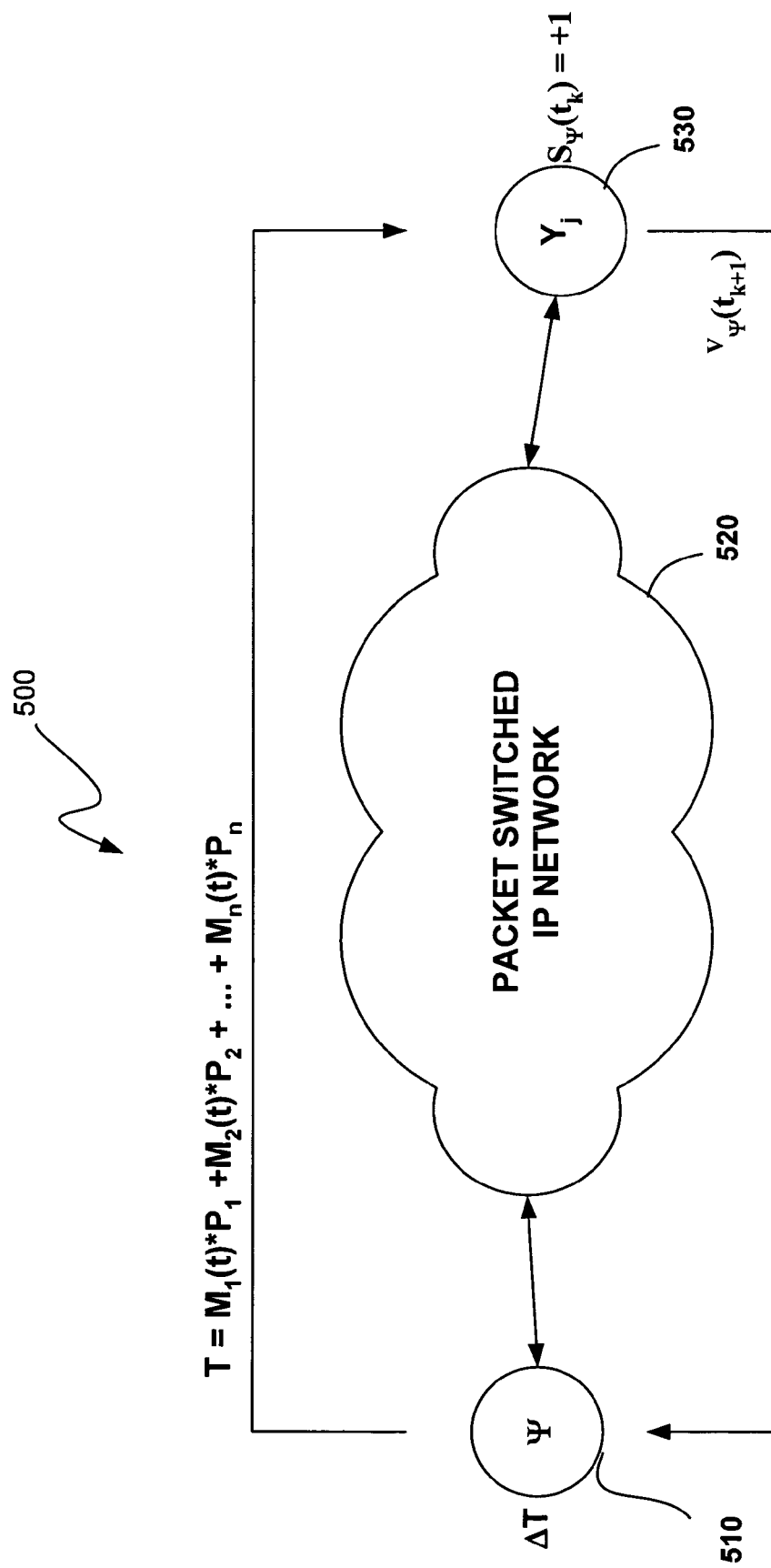
FIG. 5 is a network diagram including two nodes according to an embodiment of the invention.

FIG. 5 is a network diagram including two nodes according to an embodiment of the invention. A packet switched core IP network 500 may include a source node 510 and a destination node 530. The source node 510 is mathematically connoted by the symbol $\Psi$, and the destination node is connoted by $Y_j$. Data may be transmitted from source node 510 to the destination node 530 over IP cloud 520, such as a packet switched IP network. In one example, source node 510 has established a call with destination node 530 over the IP cloud 520 such that packets of data may flow from source node 510 to destination node 530. Source node 510 may include a memory and a processor associated with the node, as described in more detail with reference to FIG. 2, above. Source node 510 may be configured to add destination node 530 to, for example, a destination list. In one embodiment, source node 510 may be configured to add all nodes that source node 510 communicates with to the destination list. Likewise destination node 530 may be associated with a processor and a memory, and may be configured to add source node 510 to, for example, a source list.

Before allowing a new packet into the network, each node may be responsible for marking the packet with a packet sequence number. This packet sequence number may be based on the individual call/session. Additionally, each node may be responsible for time stamping the packets with the current network time. The network may introduce delay that may be determined based on the time stamped packets. In addition to delay, the network may introduce packet losses.

Upon receiving a packet, each node may be responsible for determining an end-to-end delay that the packet encountered. The end-to-end delay may be determined based on the difference between the current network time and the time stamped on the packet. In addition to determining the end-to-end delay, the network may be configured to determine a packet loss ratio associated with the transmission of the packets from one end to the other. The packet loss ratio may be calculated based on the packed sequence number that is included on the packets. Thus, source node 510 may have information regarding the end-to-end delay and the packet loss for the return trip and destination node 530 may have this information for the forward trip.

The call placed by source node 510 to destination node 530 may be associated with a particular class of call. Based on the class of the call between source node 510 and destination node 530, the algorithm may be configured to determine whether the return trip call is violating network QoS requirements. Likewise, destination node 530 may be configured to determine if the forward trip call is violating QoS requirements. In one embodiment, source node 510 may be configured to update the destination list dedicated for the destination node 530 with any change in meeting/violating QoS requirements based on the return trip information. Similarly, destination node 530 may be configured to update the entry in its source list associated with source node 510 with any change in meeting/violating QoS requirements based on the forward trip information. Destination node 530 may have the responsibility of reporting to source node 510 any significant changes in meeting/violating QoS requirements of the forward trip. This may permit source node 510 to have information about the condition both the forward trip and the return trip of the call. In one embodiment of the invention, source node 510 may then determine to continue admitting calls/sessions to destination node 530 if the severity level does not exceed a predetermined threshold severity level. Alternatively, if the severity level exceeds a predetermined severity level, source node 510 may reduce admissions of new calls or sessions to destination node 530. The amount of the reduction by source node 510 may depend on the severity level, which in turn may depend on the conditions of all of the calls and sessions. In yet another embodiment, source node 510 may be configured to permit the admission of additional calls if the severity level is below a predetermined threshold. In yet another embodiment, the algorithm may be configured to preempt low importance calls to free resources for higher importance calls. In the embodiment illustrated in FIG. 5, source node 510 transmits a data stream having an amount of traffic that may be defined by the following equation:

$$T = M_1(t)*P_1 + M_2(t)*P_2 + \ldots + M_n(t)*P_n.$$

Where $_i(t)$ is the number of calls of a predetermined class of calls over a period of t seconds. $P_i$ is the average message size for a particular class of messages. Based on the traffic received at destination node 530, the node may calculate a cost function $S_\Psi(t_k)$. The cost function $S_{105}(t_k)$ may be configured to return a value of −1, 0 or +1 based on, for example, the end-to-end delay, the packet loss ratio, and the last time of update. Destination node 530 may then update a severity function $V(t_k)$ based on the cost function. Thus, the new severity function looks like:

$$V_\Psi(t_{k+1}) = V(t_k) + S(t_{k+1})$$

Destination node 530 may then transmit the severity level $V_\Psi(t_{k+1})$ to source node 510 so that source node 510 may make any necessary adjustments to the CAC/SM policy. An exemplary listing of severity functions and description of various classes and subclasses of calls appears in Table 1, which follows.

TABLE 1

| S | Corresponding admission policy | Corresponding preemption policy |
| --- | --- | --- |
| 0 | Admit all calls/session | Do not force any preemption |
| 1 | Block Routine high resolution VTC | Do not force any preemption |
| 2 | Block all Routine VTC | Do not force any preemption<br>Force lower rate for high resolution Routine VTC using (ACR) signal |
| 3 | Block all Routine VTC and Routine voice | Do not force any preemption<br>Force lower rate for high resolution Routine VTC using (ACR) signal |
| 4 | Block all Routine VTC and Routine voice<br>Block Priority high resolution VTC | Force preemption of all Routine calls |
| 5 | Block all Routine VTC and Routine voice<br>Block all Priority VTC | Force preemption of all Routine calls<br>Force lower rate for high resolution Priority VTC using (ACR) signal |
| 6 | Block all Routine VTC and Routine voice<br>Block all Priority VTC and Priority voice | Force preemption of all Routine calls<br>Force lower rate for high resolution Priority VTC using (ACR) signal |
| 7 | Block all Routine VTC and Routine voice<br>Block all Priority VTC and Priority voice<br>Block Immediate high resolution VTC | Force preemption of all Routine calls<br>Force preemption of all Priority calls |
| 8 | Block all Routine VTC and Routine voice<br>Block all Priority VTC and Priority voice<br>Block all Immediate VTC | Force preemption of all Routine calls<br>Force preemption of all Priority calls<br>Force lower rate for high resolution Immediate VTC using (ACR) signal |
| 9 | Block all Routine VTC and Routine voice<br>Block all Priority VTC and Priority voice<br>Block all Immediate VTC and Immediate voice | Force preemption of all Routine calls<br>Force preemption of all Priority calls<br>Force lower rate for high resolution Immediate VTC using (ACR) signal |
| 10 | Block all Routine VTC and Routine voice<br>Block all Priority VTC and Priority voice<br>Block all Immediate VTC and Immediate voice<br>Block Flash high resolution VTC | Force preemption of all Routine calls<br>Force preemption of all Priority calls<br>Force preemption of all Immediate calls |
| 11 | Block all Routine VTC and Routine voice<br>Block all Priority VTC and Priority voice<br>Block all Immediate VTC and Immediate voice<br>Block all Flash VTC | Force preemption of all Routine calls<br>Force preemption of all Priority calls<br>Force preemption of all Immediate calls Force lower rate for high resolution Flash VTC using (ACR) signal |

TABLE 1-continued

| S | Corresponding admission policy | Corresponding preemption policy |
|---|---|---|
| 12 | Block all Routine VTC and Routine voice<br>Block all Priority VTC and Priority voice<br>Block all Immediate VTC and Immediate voice<br>Block all Flash VTC and Flash voice | Force preemption of all Routine calls<br>Force preemption of all Priority calls<br>Force preemption of all Immediate calls Force lower rate for high resolution Flash VTC using (ACR) signal |
| 13 | Block all Routine VTC and Routine voice<br>Block all Priority VTC and Priority voice<br>Block all Immediate VTC and Immediate voice<br>Block all Flash VTC and Flash voice | Force preemption of all Routine calls<br>Force preemption of all Priority calls<br>Force preemption of all Immediate calls Force preemption of all Flash calls |

Assuming that the severity level at t is 3, and that the received traffic T at destination node 530 was such that the severity level was increased by 1, source node 510 may block all routine VTC and routine voice calls, and all high-resolution VTC calls. Additionally, routine calls may be preempted. The foregoing example and table is meant to be illustrative only and users may define any type of preemption and admission policies that they deem effective depending on the size and type of network as well as the amount of total network traffic.

Another example of severity levels that may be used in association with the present invention, and particularly relating to non-interactive traffic appears in Table 2, below

TABLE 2

| S | Corresponding admission policy | Corresponding preemption policy |
|---|---|---|
| 0 | Admit all sessions | Do not force any preemption |
| 1 | Block Routine large size data | Do not force any preemption |
| 2 | Block Routine large size data<br>Block Routine streaming video | Do not force any preemption |
| 3 | Block all Routine data and Routine streaming video | Do not force any preemption |
| 4 | Block all Routine data and Routine streaming video<br>Block Priority large size data | Force preemption of all Routine streaming video |
| 5 | Block all Routine data and Routine streaming video<br>Block Priority large size data<br>Block Priority streaming video | Force preemption of all Routine streaming video |
| 6 | Block all Routine data and Routine streaming video Block all Priority data and Priority streaming video | Force preemption of all Routine streaming video |
| 7 | Block all Routine data and Routine streaming video Block all Priority data and Priority streaming video Block Immediate large size data | Force preemption of all Routine streaming video<br>Force preemption of all Priority streaming video |
| 8 | Block all Routine data and Routine streaming video Block all Priority data and Priority streaming video Block Immediate large size data Block Immediate streaming video | Force preemption of all Routine streaming video<br>Force preemption of all Priority streaming video |
| 9 | Block all Routine data and Routine streaming video Block all Priority data and Priority streaming video Block all Immediate data and Immediate streaming video | Force preemption of all Routine streaming video<br>Force preemption of all Priority streaming video |
| 10 | Block all Routine data and Routine streaming video<br>Block all Priority data and Priority streaming video<br>Block all Immediate data and Immediate streaming video<br>Block Flash large size data | Force preemption of all Routine streaming video<br>Force preemption of all Priority streaming video<br>Force preemption of all Immediate streaming video |
| 11 | Block all Routine data and Routine streaming video<br>Block all Priority data and Priority streaming video<br>Block all Immediate data and Immediate streaming video<br>Block Flash large size data<br>Block Flash streaming video | Force preemption of all Routine streaming video<br>Force preemption of all Priority streaming video<br>Force preemption of all Immediate streaming video |

TABLE 2-continued

| S | Corresponding admission policy | Corresponding preemption policy |
|---|---|---|
| 12 | Block all Routine data and Routine streaming video | Force preemption of all Routine streaming video |
|  | Block all Priority data and Priority streaming video | Force preemption of all Priority streaming video |
|  | Block all Immediate data and Immediate streaming video | Force preemption of all Immediate streaming video |
|  | Block all Flash data and Flash streaming video | |
| 13 | Block all Routine data and Routine streaming video | Force preemption of all Routine streaming video |
|  | Block all Priority data and Priority streaming video | Force preemption of all Priority streaming video |
|  | Block all Immediate data and Immediate streaming video | Force preemption of all Immediate streaming video |
|  | Block all Flash data and Flash streaming video | Force preemption of all Flash streaming video |

In this embodiment of the invention, large sized files may include messages that may result in more than n MTU messages, thereby exceeding the maximum payload per IP packet the core network is configured to handle.

Network severity levels may be affected by conditions on the network such as, for example, loss of signal on a link, due to, for example, damage to the transmission path; traffic increases, large messages being sent over the system (either low or high priority messages). Likewise, severity levels may decrease when additional links are added, there is a decrease in network traffic or after large messages have been completed.

In some embodiments of the invention, an end-user may establish their own set of N severity levels depending on the usage of the network and the type of information being transmitted over the network. In some embodiments, there may be thirteen severity levels. In an alternative embodiment, there may be five severity levels. In yet another embodiment, there may be 20 severity levels.

With specific reference to forward traffic severity levels, each destination node may keep track of the impact of traffic for each source sending messages to that particular destination node. The severity level can be a summary of the traffic load of the various classes of traffic within the network, and more particularly between a source node and a destination node. In one embodiment, each time the severity level changes, the destination node 530 may send an update severity value to the source node 510.

In one exemplary embodiment, voice, video and data traffic may travel from a number of source nodes $S=\{\Psi_1, \Psi_2, \Psi_3, \ldots \Psi_n\}$ to a number of destination nodes $D+\{Y_1, Y_2, Y_3, \ldots Y_n\}$. In this exemplary embodiment, Data classes may be designated as $D_1, D_2, D_3, \ldots, D_{n1}$, voice classes may be designated as $V_1, V_2, V_3, \ldots, V_{n2}$, and video classes may be designated by $VTC_1, VTC_2, VTC_3, \ldots, VTC_{n3}$. These classes may be mapped to $\{C_1, C_2, C_3, \ldots, C_n\}$, where $C_i$ corresponds to a class of service and $n=-n1+n2+n3$. In this example, for each class of call $\{C_1, C_2, C_3, \ldots, C_n\}$ there may be corresponding QoS attributes $\{Q_1, Q_2, Q_3, \ldots, Q_n\}$, where $Q_i \leq R_i, T_i, E_i, \ldots >$ with $R_i$ is the required fraction of packets of class $C_{i1}$ with end-to-end delay less than $T_i$ seconds, and $E_i$ is an acceptable packet loss ratio.

Figure 6:
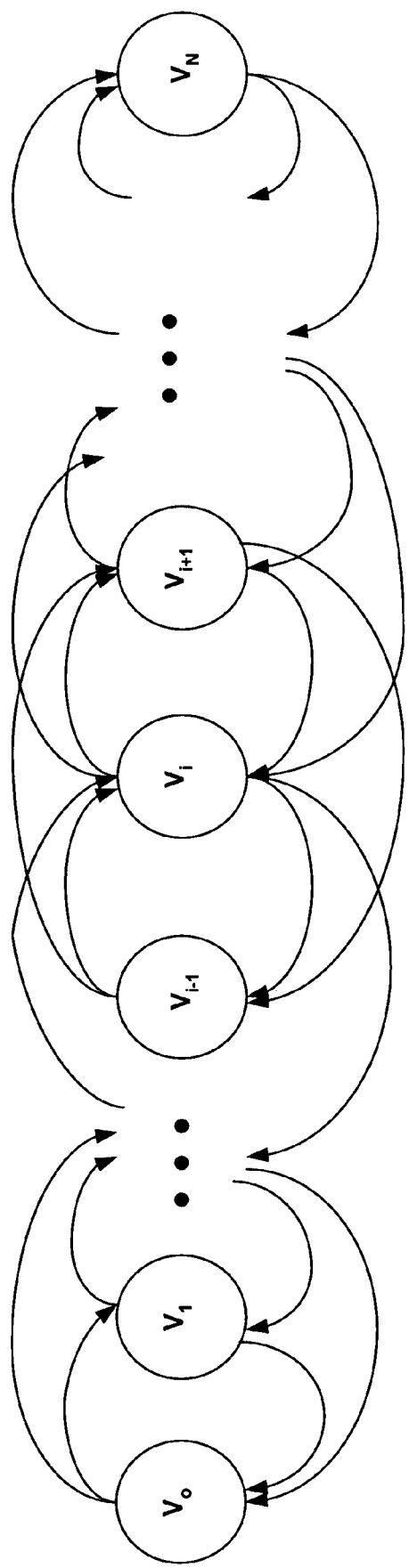
FIG. 6 illustrates a Markov chain that may be used in connection with the algorithm according to an embodiment of the invention.

In one example, destination node 530 may receive a packet of class C.sub.p from source node 510. When destination node 530 receives this packet, the algorithm may calculate a cost function and may update the severity level as appropriate, as described above. In one embodiment, if the severity level value changes in value, destination node 530 will return the severity value to source node 510. In an alternative embodiment, the severity value may be returned to source node 510 regardless of whether it has changed or not. Based on a received severity value from destination node 530, source node 510 may change its admission policy accordingly. Since $S(t_{k+1})$ may depend on the current utilization of the system and is independent of the severity value for the time prior to $t_k$ for any sequence of times $t_0 < t_1 < \ldots < t_{m+1}$, and values $U_0, U_1, \ldots, U_{m+1}$ in the range of the severity values, the severity values may be represented by a Markov chain, as illustrated in FIG. 6. The Markov chain may take values in the range of $\{1, 2, \ldots, N\}$. In one embodiment, the cost function S may be defined so that the jitter in the severity levels may be removed. This may be done, for example, by permitting a predetermined time period to pass before S may return a non-zero value. In the Markov chain illustrated in FIG. 6, the source node admission policies (or decisions to change topology) may be made based on the highest of the severity levels. Markov chains allow a probability-based determination based on current conditions to predict what the value of, for example, the next seventy value will be.

In one embodiment, an empirical analysis of voice calls may produce a Poisson distribution for voice calls inter-arrival time and an exponential distribution for packet inter-arrival times and packet lengths. This relationship may be given by the following equation:

$$W(t)=a^*\exp(-a^*t); \text{ and}$$

$$Z(t)=b^*\exp(-b^*t).$$

This equation characterizes the packet length and packet inter-arrival time of voice calls. Adding multiple voice calls at a given source node may yield an Erlang type of distribution.

Similarly, a Poisson distribution for video call inter-arrival time and exponential distributions for packet inter-arrival times and packet lengths, which is given by the following equations:

$$W'(t)=a'^*\exp(-a'^*t); \text{ and}$$

$$Z'(t)=b'^*\exp(-b'^*t)$$

This equation characterizes the packet length and packet inter-arrival time of video. Adding multiple video calls at a given source node may yield an Erlang type of distribution.

Additionally, it has been observed that data traffic of the internet type is self-similar and is made up of bursty traffic having Pareto, or similar, distributions for message length rather than exponential distributions, which is given by the following equation:

$$P(t) = \alpha / t^{\alpha+1}.$$

This relationship assumes that β=1. Consequently network traffic with voice, video, and data may be characterized as a mixture of Exponential/Erlang and Pareto distributions. Thus, network traffic with voice, video, and data traffic may be represented by the following equation:

$$X(t) = E_1(t) + \ldots + E_j(t) + E'_1(t) + \ldots + E'_j(t) + P_1(t) + \ldots + P_k(t)$$

where the $E_x$ are Exponential or Erlang and the $P_x$ are Pareto.

Application of the cost function and the consequent change in Severity value may engender blocking of class $C_i$ messages causing the corresponding values a and b to be modified for Exponential and Erlang distributions and truncation of the fat tail in case of a Pareto distribution. These distributions characterize the information flow in the system.

Figure 7:
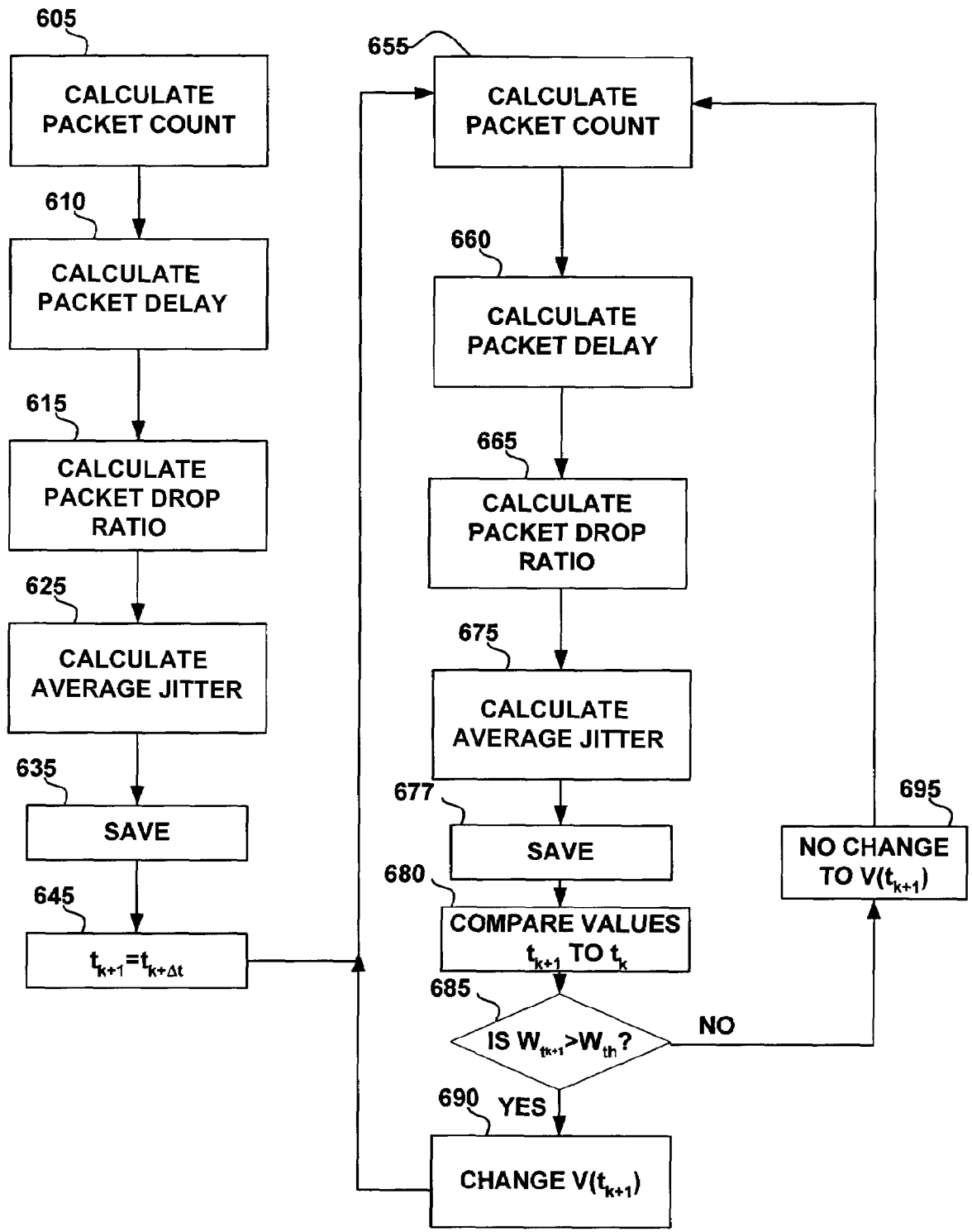
FIG. 7 is a flow diagram of a method of applying a severity level according to an embodiment of the invention.

Now, based on these relationships, an algorithm may be configured to determine an CAC/SM policy in a distributed fashion to regulate the flow of network traffic between two nodes. FIG. 7 is a flow diagram of a method of determining a severity level according to an embodiment of the invention. As discussed above, a destination node may receive a packet from a source node. After receiving the packet from the source node, the algorithm may be configured to calculate a packet count, step 605, calculate a packet delay 610 and calculate a packet drop ratio 615. In one embodiment, the algorithm may also be configured to calculate an average jitter, step 625. These values may then be saved, step 635 in, for example, a computer readable memory device, such as for example, a magnetic or an electronic computer-readable medium (e.g., a disk, or a hard drive). Alternatively, the values may be saved on an optical computer-readable medium, such as, for example, a writable compact disc (CD).

After these values are saved, a time period equal to 1 period may pass. The time period may be any acceptable time period, such as, for example, 1 second. This time period may be system dependent. In one embodiment of the invention the time period may decrease if the flow of traffic within the network is high. This may be achieved by keeping a count of the number of packets received within the time period. If the number of packets exceeds a certain threshold, such as, for example, 100 packets before the predetermined time period expires, a new timing may be utilized. For time period $t_{k+1}$, step 645, a packet count may be calculated, 655, a packet delay may be calculated 660, and a packet drop ratio may also be calculated 665. In one embodiment, the average jitter may also be calculated. The values from time $t_k$ and $t_{k+1}$ may be compared, step 680, and a value $W_{tk+1}$ may be calculated based on the comparison. The values determined in steps 655, 660, 665, and 675 may be saved, step 677, in a computer-readable medium for comparison purposes, in an embodiment where the algorithm may continue in a loop. If the value of $W_{tk+1}$ is greater than a threshold value ($W_{th}$), step 685, then the Cost function S, and ergo, the severity value $V(t_{k+1})$ may be updated, step 690. If the value of $W_{tk+1}$ is less than $W_{th}$, then the cost function may return a value of 0, and the severity function $V(t_{k+1})$ does not need to be updated, step 695. The process may loop back to step 655 when another packet is received. Another time period equal to, for example, one period may pass and the packet count, packet delay, and the packet drop ratio may be recalculated for the new time period. The algorithm may then determine whether to update the severity level based on these new values as described above.

Figure 8:
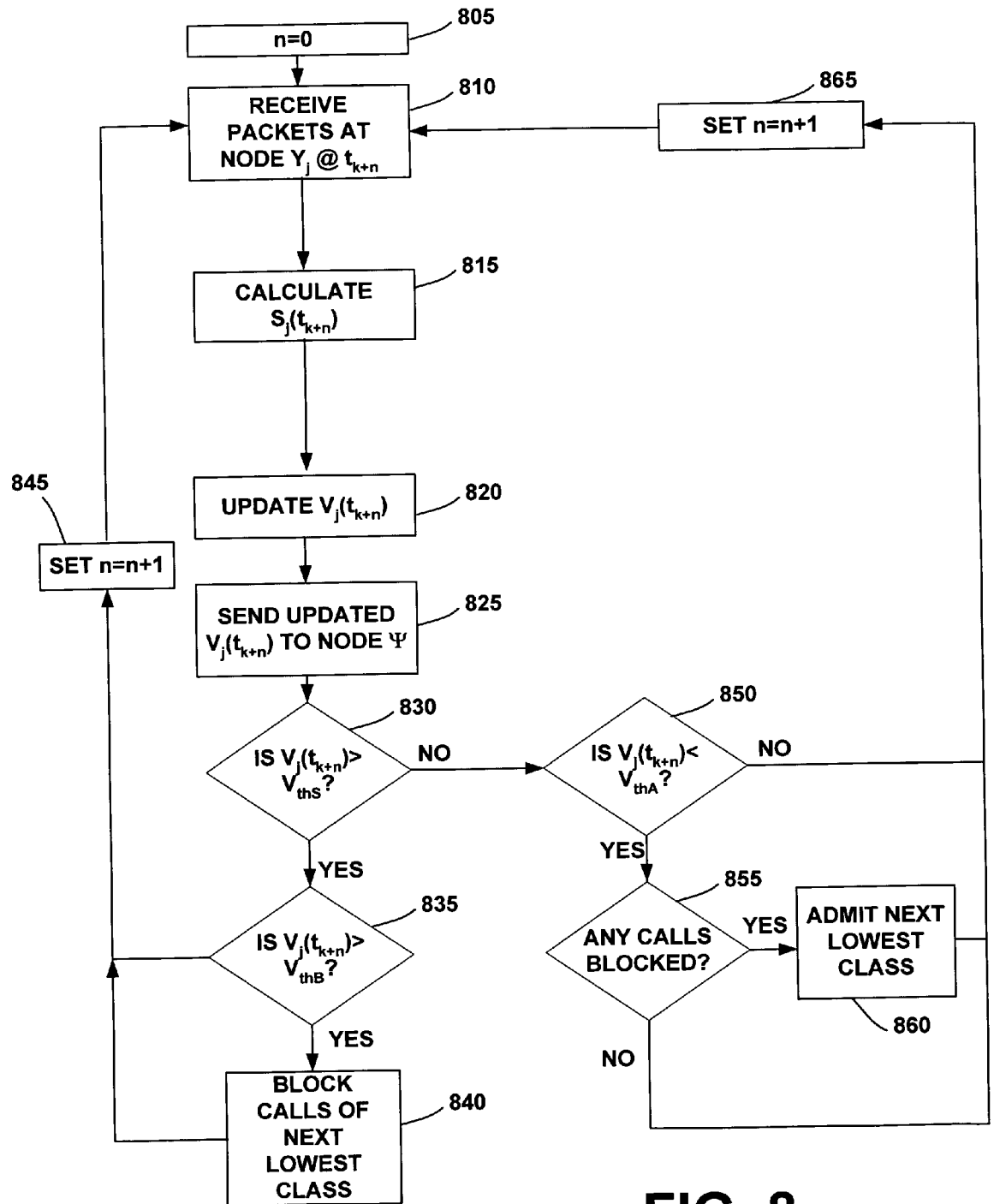
FIG. 8 is a flow diagram of a method of determining a CAC/SM policy according to one embodiment of the invention.

FIG. 8 is a flow diagram of a method of determining a CAC/SM policy according to one embodiment of the invention. Initially, a time may be represented by $t_{k+n}$, where n=0, step 805. The packet may be received at destination node 530 at time $t_{k+n}$, where n=0, step 810. Based on the received packets, the algorithm may calculate a cost function $S_j(t_{k+n})$, step 815. In one embodiment, the cost function may return values, such as, for example, −1, 0, and +1. Based on the value returned from the cost function, the severity level $V_j(t_{k+n})$ may be updated, step 825. In one embodiment, when the cost function returns a value of +1, the severity level is increased by 1, when the cost function returns a value of −1, the severity level is decreased by 1, and when the cost function returns a value of 0, the severity level remains unchanged. Once the severity level has been updated, the updated severity level may be returned to the source node 510, step 825. In an alternative embodiment, the algorithm may only send the severity level to the source node 510 if it has been updated. Once received at the source node 510, the algorithm runs on, for example, the source node processor can determine if the updated severity value ($V_j(t_{k+n})$), which is above a severity value threshold ($V_{thS}$), step 830. If the severity value is above a threshold, then the algorithm may determine if the severity value exceeds a blocking threshold ($V_{thB}$) associated with a CAC/SM policy, step 835. If the severity value, $V_j(t_{k+n})$, is above the blocking threshold, $V_{thB}$, then the algorithm may be configured to block either the lowest class of calls (if no calls are blocked) or the next lowest class of calls (if there are calls blocked), step 840. Time may be allowed to pass to the next period, which is represented by an equivalent block setting n=n+1, where n+1 represents the next period, step 845.

If the severity value is not greater than the predetermined threshold, the severity value $V_j(t_{k+n})$ may be compared to an admission threshold $V_{thA}$, step 850. If the severity value $V_j(t_{k+n})$ does not exceed the admit threshold $V_{thA}$, the algorithm may allow time to pass to the next period, which is represented by an equivalent block setting n=n+1, where n+1 represents the next period, step 865. When the severity level is less than $V_{thA}$, a determination may be made as to whether there are any classes of calls being blocked, 855. If there are any classes of calls being blocked, then the class of calls associated with the next lowest severity level may be admitted, step 860. Time may be allowed to pass to the next period, which is represented by an equivalent block setting n=n+1, where n+1 represents the next period, step 865.

In an alternative embodiment, the severity value $V_j(t_{k+n})$ is not compared with a predetermined threshold, but rather may be referenced against, for example, a table, such as a look up table to determine a CAC/SM policy that reflects current network conditions. For example, the severity level received from destination node 530 may be compared to a table associated with the CAC/SM to determine if any calls should be blocked or admitted. In another alternative embodiment, entire classes of calls are not blocked, but calls of a particular class having a size larger than a threshold size may be blocked. Therefore, the CAC/SM policy may improve or maintain QoS by limiting the amount of total traffic on the network by simply reducing the size of the calls and sessions admitted over the network.

Figure 9:
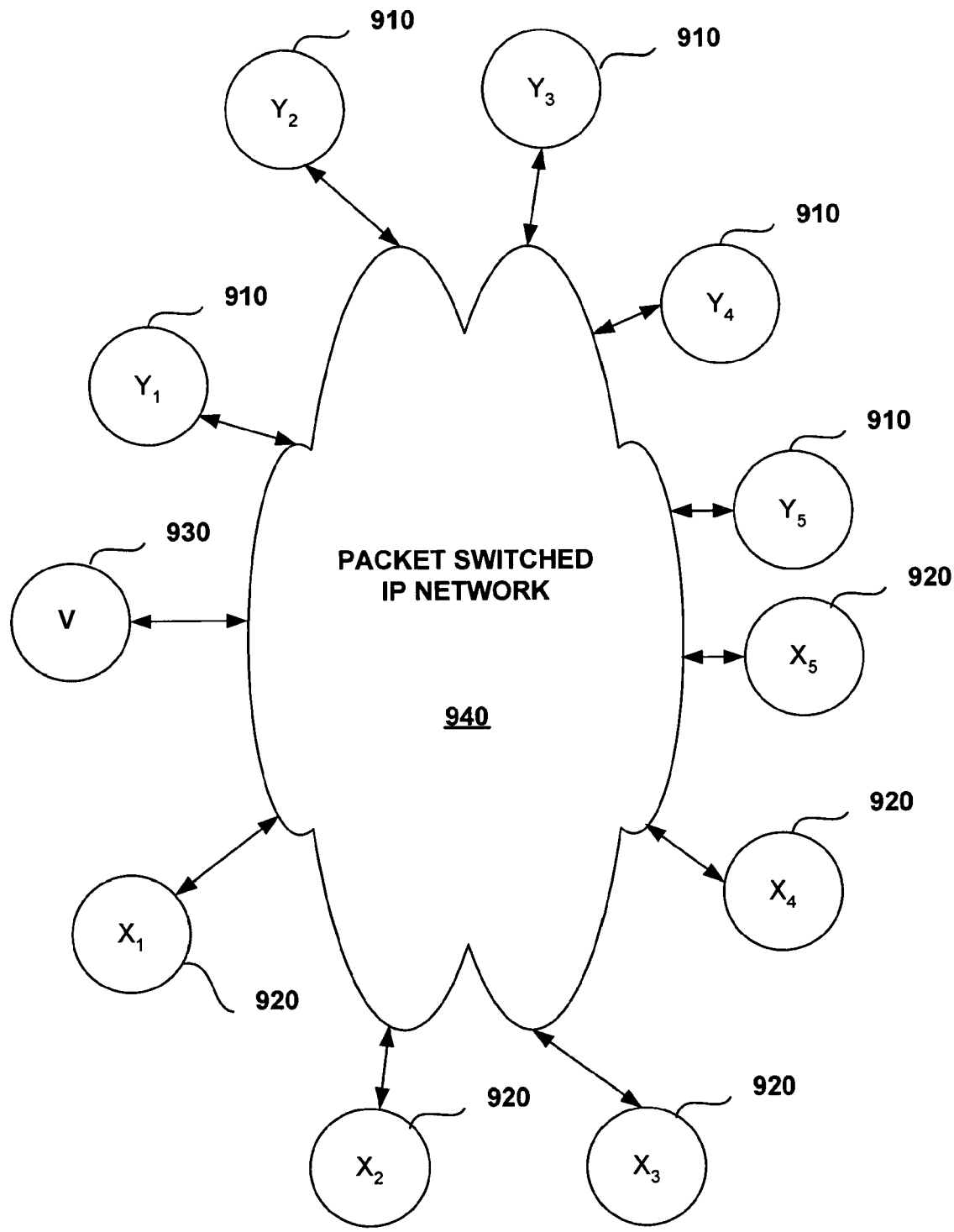
FIG. 9 illustrates an packet switched IP network topology according to another embodiment of the invention.

FIG. 9 illustrates a Packet Switched IP Network topology according to another embodiment of the invention. A multiple node network is illustrated in FIG. 9, including a number of source nodes 910 ($Y_i$), which transmit data to node 930 ($v$), and a number of destination nodes 920 ($X_i$), which receive data from node 930 over packet switched IP network 940.

For each of the destination nodes 920, the destination list established by the algorithm may include a destination node identifier (ID) which may specify the unique identification of the node on the network; the forward traffic severity level which is reported by the destination node 920, as described above; the last update time, which indicates the last time the severity level was updated; the total number of received packets of classes $C_1$-$C_n$ (broken down by class), the total number of packets violating end-to-end delay times and the packet loss associated with each class of packets sent. Additionally, the destination list may also include the return traffic severity level, which indicates the severity level associated with the return traffic for each of the destination nodes 920. Similarly, for each of the source nodes 910, the source list may contain a source node identifier (ID), a forward traffic severity level, and the last update time, which indicates the last time the severity level was updated; the total number of received packets of classes $C_1$-$C_n$ (broken down by class), the total number of packets violating end-to-end delay times and the packet loss associated with each class of packets received.

In one embodiment, the algorithm may be configure to drop old information by factoring down the collected counters every period. This may ensure that the counters have more recent information based on the recent network conditions. Additionally, in some embodiments, the algorithm may continuously look at the collected information for each data structure, compare it to the values of QoS attributes for each class of service (% packets to meet certain end-to-end delay, % of allowed packet loss), and may generate a severity level for each source node 910 ("$X_1$", "$X_2$", "$X_3$", "$X_4$" and "$X_5$"). Any change in the severity level may be reported to the source node using, for example, a token.

In yet another embodiment of the invention, the algorithm may include a method that is capable of distinguishing between the loss of a signal or a signal blockage and a sudden arrival or a surge in network usages and therefore, may apply a different CAC/SM policy depending on the particular deleterious effects on the network.

Figure 10:
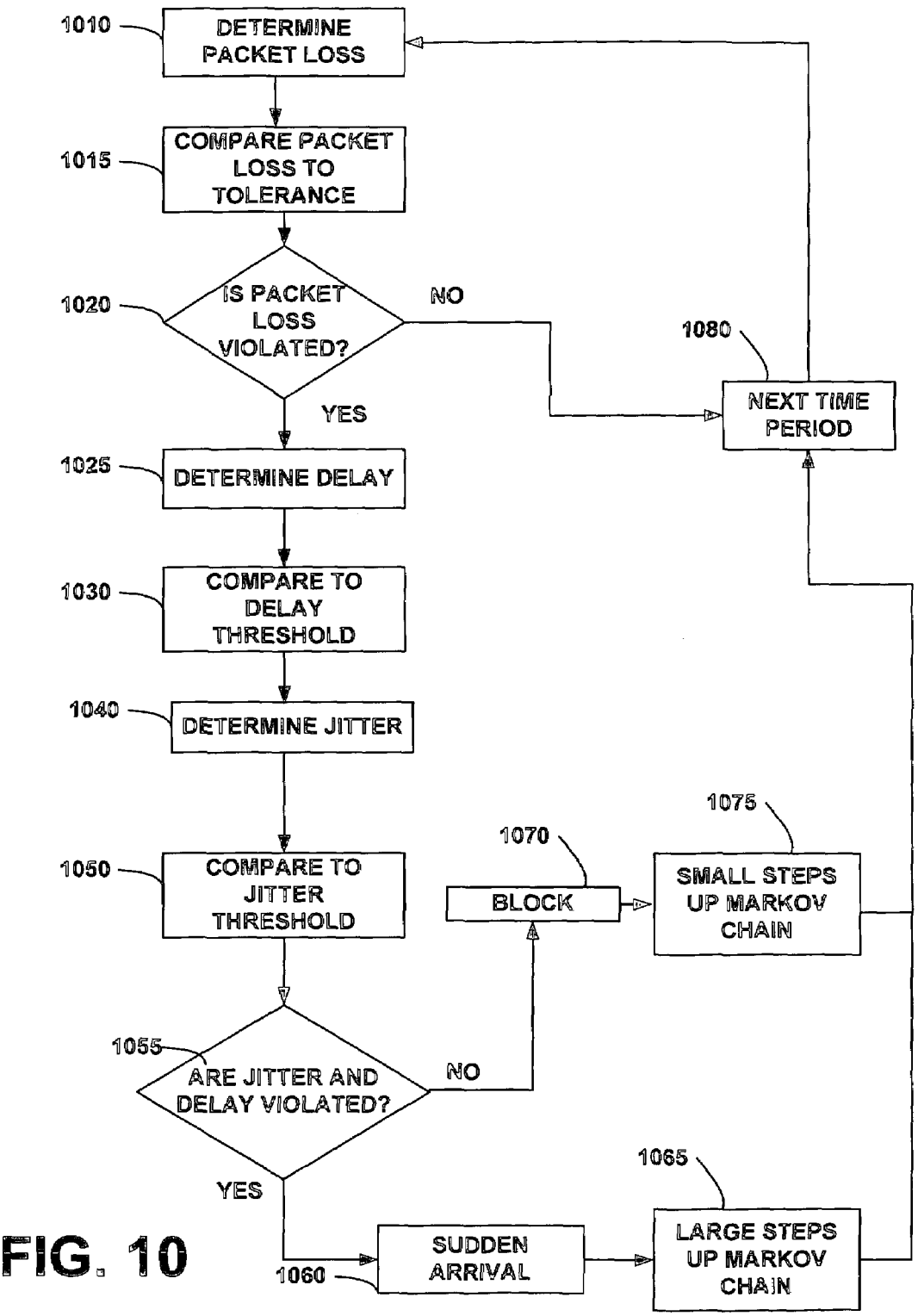
FIG. 10 is a flow diagram of a method of determining when network behavior is due to sudden arrival or blockage according to an embodiment of the invention.

FIG. 10 is a flow diagram of a method of determining when network behavior is due to sudden arrival or blockage according to an embodiment of the invention using, for example, a window of values. After a packet is received at a node, the packet loss may be determined, step 1010. Once the packet loss is determined, the packet loss determined in step 1010 may be compared to a packet loss tolerance, step 1015. In one embodiment, the packet loss tolerance may be, for example, a 10% loss. Any packet loss tolerance may be used in connection with the present invention according to the particular characteristics of the network. If the packet loss tolerance is not violated, step 1020, then the algorithm will wait until the next time period, step 1080 and then repeat the loop. If the packet loss tolerance is violated, the end-to-end delay may be determined, step 1025. The delay may be compared to a delay threshold, step 1030. Then the jitter is determined, step 1040. The jitter is compared to a jitter threshold 1050. A determination may be made to see if both the jitter and the delay violate their respective thresholds, step 1055. If both jitter and delay exceed their thresholds, then the violation in packet loss may be due to sudden arrival, step 1060, and the algorithm may take large steps up the Markov chain 1065. The algorithm may permit conditions to remain unchanged until the next time period, step 1080, when the algorithm may repeat the loop. If jitter and delay are not above the thresholds, then the increase in packet loss may be due to a blockage, step 1070, and the algorithm may be configured to take small steps up the Markov chain, step 1075. The algorithm may permit conditions to remain unchanged until the next time period, step 1080, when the algorithm may repeat the loop.

While various embodiments of the invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

For example, while many of the embodiments of the invention were made with specific reference to blocking classes of calls or data, it should be understood that an algorithm may be configured to restrict calls exceeding a threshold size within a particular class of calls prior to blocking an entire class of calls. Additionally, while the invention was described as being related to N severity levels, it is within the scope of the invention to define any workable number of severity levels for defining the CAC/SM policy for a network.

An algorithm according to embodiments of the present invention described herein may (1) work on a heterogeneous/homogenous network; (2) work independently of the approaches used for routing, queuing, traffic shaping, etc. which makes it suitable for applications such as, for example but not limited to, military networks with security requirements and for enterprise LAN that uses a service provider core network; (3) work with a network with fixed topology as well as an ad-hoc network with topology and bandwidth that changes with time; (4) have a high level of sensitivity between each source and destination of traffic; (5) minimize the amount of control traffic needed to report congestion; (6) react to changes in path utilization between source/destination; (7) account for QoS attributes for each class of service in computing the severity level between source and destination and in admitting calls/sessions to the network; (8) implement a multilevel priority and preemption (MLPP) approach where a call/session is categorized according to its importance, size, real-time requirements, etc; (9) perform individual call monitoring (i.e., in addition to monitoring the state of the source/destination path, the algorithm monitors individual calls for QoS violation allowing preemption of a low priority call that consistently violates QoS and as a result frees the network resources); and (10) permit a flexible configuration in that a set of modifiable parameters may adjust the behavior of the algorithm when needed.

An algorithm according to various embodiments of the invention may have advantages over prior art networks in that it permits a call admission control that may work in a distributed fashion. Additionally, according to some embodiments, the network may be scalable, permitting easy addition or deletion of nodes in the network. Additionally, in some embodiments, the number of severity levels, and their definitions may be modifiable based on the sensitivity required on the network. Furthermore, according to some embodiments of the invention, the algorithm may be proactive, in that it may be configured to continuously attempt to increase the flow of traffic on the network, and may operate in real-time. Additionally, embodiments of the invention may permit the maintenance or regulation of QoS on a network, such as for example, a WAN where no QoS information is transmitted from the network.

While the preceding sections describe several embodiments, they are not meant to limit the scope of the invention in any way. For example, while particular embodiments were described using CAC/SM call admission policies, it should be understood that any number of call admission policies may be used in connection with the invention, such as, for example, a MLPP policy. It will be apparent to those skilled in the art that various modifications and variations can be made in the apparatus and methods of the invention without departing from their spirit and scope.

We claim:

1. An apparatus, comprising:
   a first node;
   a second node coupled to the first node via a first network path;
   a first processor associated with the first node, the first processor configured to:
      apply one of a plurality of call admission policies associated with one of a plurality of severity levels, and
      selectively transmit packets of data to the second node based on a type of data within each packet in accordance with the one of the plurality of call admission policies; and
   a second processor associated with the second node and configured to:
      receive a packet of data from the first processor, the packet of data including a condition of the first network path,
      calculate a different severity level for the first network path based on the condition of the network path, and
      transmit the different severity level to the first processor,
      wherein the first processor is further configured to replace the one of the plurality of admission policies with a different one of the plurality of admission policies based on the different severity level.

2. The apparatus of claim 1, wherein the severity level is based on a packet delay and a packet loss ratio between the first node and the second node.

3. The apparatus of claim 1, wherein the packets of data are associated with a plurality of classes of data, the one of the plurality of call admission policies being configured to block packets of data associated with at least one class of the plurality of classes of data when the severity level is greater than or equal to a predetermined threshold severity level.

4. The apparatus of claim 3, wherein the plurality of classes includes a plurality of subclasses, each class of the plurality of subclasses being associated with messages having different bandwidth requirements, the one of the plurality of call admission policies being configured to block packets of data associated with at least one subclass of the class of packets being blocked.

5. The apparatus of claim 1, the severity level being a first severity level, the apparatus further comprising:
   a third node configured to transmit packets of data to the first node via a second network path; and
   a third processor associated with the third node, the first node being configured to receive the packets of data from the third node, the first processor being configured to calculate a second severity level based on a condition of the second network path, and transmit the second severity level to the third node, whereby the third node can apply one of the plurality of call admission policies to regulate the transmission of packets of data from the third node to the first node.

6. The apparatus of claim 1, the severity level being a first severity level, the apparatus further comprising:
   a third node configured to receive packets of data transmitted from the first node to the third node via a second network path; and
   a third processor, the third processor being configured to calculate a second severity level based on a condition of the second network path, and being configured to transmit data associated with the second severity level to the first node, whereby the first node can determine one of the plurality of call admission policies to regulate the transmission of packets from the first node to the third node.

7. The apparatus of claim 1, further comprising:
   a memory device associated with the first node, the memory device being configured to store data associated with at least one of the severity level; a packet delay; the total number of received packets; and a packet loss.

8. The apparatus of claim 1, further comprising:
   a memory device associated with the first node, the memory device being configured to store data associated with a destination list and a source list, the destination list including data associated with packets of data being transmitted from the first node to the second node and the source list including data associated with packets of data being received at the first node.

9. A method of maintaining quality of service in a computer network, comprising: transmitting a first packet of data from a first node to a second node by a network path in accordance with a first call admission policy based on a first severity level for the network path; receiving the first packet of data at the second node;
   determining, by the second node, a second severity level for the network path based on a condition of the network path; transmitting, by the second node, data associated with the second severity level to the first node; receiving the data associated with the second severity level at the first node;
   comparing, by the first node, the first severity level and the second severity level; replacing the first call admission policy with a second call admission policy, by the first node based on the first severity level and the second severity level being different severity levels; and applying, by the first node, the second call admission policy to regulate the transmission of packets of data from the first node to the second node based on a type of data included within the packets of data.

10. The method of claim 9, further comprising:
    applying the second call admission policy to perform one of admit packets of data associated with a previously blocked class of packets and block packets of data associated with a previously admitted class of packets.

11. The method of claim 9, further comprising:
    transmitting a second packet of data from a third node to the first node in accordance with a third call admission policy based on a third severity level;
    receiving the second packet of data at the first node;
    determining a fourth severity level based on the second packet of data;
    transmitting data associated with the fourth severity level to the third node;
    receiving the data associated with the fourth severity level at the third node;
    comparing the third severity level and the fourth severity level;
    replacing the third call admission policy with a fourth call admission policy if the third severity level and the fourth severity level are different severity levels; and
    applying the fourth call admission policy based on the fourth severity level to regulate the transmission of packets of data from the third node to the first node based on a type of data included within the packets of data.

12. The method of claim 9, further comprising:
    transmitting a second packet of data from the first node to a third node in accordance with a third call admission policy based on a third severity level;
    receiving the second packet of data at the third node;

determining a fourth severity level based on the second packet of data;

transmitting data associated with the fourth severity level to the first node;

receiving the data associated with the fourth severity level at the first node;

comparing the third severity level and the fourth severity level;

replacing the third call admission policy with the fourth call admission policy if the third severity level and the fourth severity level are different severity levels; and applying the fourth call admission policy based on the fourth severity level to regulate the transmission of packets from the first node to the third node based on a type of data included within the packets of data.

13. The method of claim 9, further comprising:

storing data associated with at least one of the first severity level; a packet delay; the total number of received packets; and a packet loss in a memory device associated with the first node.

14. The method of claim 9, further comprising:

storing data associated with a destination list and a source list, the destination list including data associated with packets of data being transmitted from the first node to the second node and the source list including data associated with packets of data being received at the first node.

15. A computer-readable medium encoded with processor readable codes, executed by the processor to perform steps to: receive data associated with a current severity level in accordance with a first call admission policy, the current severity level being determined at a second node based on a packet of data transmitted from a first node to the second node; compare the current severity level with a previous severity level for regulating the transmission of packets of data from the first node to the second node; replace the first call admission policy with a second call admission policy based on the previous severity level and the current severity level being different severity levels; and apply the second call admission policy to regulate the transmission of packets of data from the first node to the second node based on a type of data included within the packets of data.

16. The computer-readable medium of claim 15, wherein the processor readable codes further comprising the processor to perform steps to: calculate a cost function based on a packet of data received from a remote node; replace one of the current severity level and the previous severity level with an updated severity level; and transmit the updated severity level to the remote node.

17. The computer-readable medium of claim 15, wherein the processor readable codes further comprising the processor to apply the second call admission policy to admit a first class of calls when the current severity level is less than the previous severity level and to block a second class of calls when the current severity level is greater than or equal to the previous severity level.

18. The computer-readable medium of claim 15, wherein the processor readable codes further comprising to apply the second call admission policy to admit calls greater than a predetermined size associated with a predetermined class when the current severity level is less than the previous severity level and to block calls that will consume less than or equal to a predetermined bandwidth associated with the predetermined class when the current severity level is greater than the previous severity level.

19. The method of claim 9, further comprising applying a first call admission policy based on the first severity level to regulate the transmission of the first packet of data from the first node to the second node, wherein the first and second severity levels are different severity levels, the method further comprising applying a second call admission policy based on the second severity level to regulate the transmission of the second packet of data from the first node to the second node.

20. A method of maintaining quality of service in a computer network where no quality of service information is received from the computer network, comprising: transmitting a packet of data from a first node to a second node by a network path in accordance with a first call admission policy based on a first severity level of the network path; receiving the packet of data at the second node; determining, by the second node, a second severity level based on a condition of the network path; transmitting, by the second node, data associated with the second severity level to the first node; receiving the data associated with the second severity level at the first node; comparing, by the first node, the first severity level and the second severity level; replacing the first call admission policy with a second call admission policy, by the first node, based on the first severity level and the second severity level being different severity levels; and applying, by the first node, the second call admission policy to regulate the transmission of packets of data from the first node to the second node based on a type of data included within the packets of data and without using QoS data from the computer network.

21. The method of claim 20, wherein maintaining the quality of service includes maintaining the quality of service on a wide area network.

22. The method of claim 20, wherein maintaining the quality of service includes maintaining the quality of service on a secure network.

23. The method of claim 22, wherein the quality of service is maintained on a military network.

24. The method of claim 22, wherein the quality of service is maintained on a commercial network.

25. The method of claim 20, wherein applying the call admission policy includes applying a multilevel precedence and preemption policy.

* * * * *

UNITED STATES PATENT AND TRADEMARK OFFICE
CERTIFICATE OF CORRECTION

PATENT NO.       : 7,616,572 B2                                   Page 1 of 1
APPLICATION NO.  : 10/813603
DATED            : November 10, 2009
INVENTOR(S)      : Elmasry et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1149 days.

Signed and Sealed this

Nineteenth Day of October, 2010

David J. Kappos
*Director of the United States Patent and Trademark Office*